United States Patent [19]

Daniels

[11] Patent Number: 5,251,921
[45] Date of Patent: Oct. 12, 1993

[54] SPORTSMAN'S PORTABLE SUPPLY BOX SUITED FOR ICE FISHING

[76] Inventor: Robert R. Daniels, 8779 N. Christine Dr., Brighton, Mich. 48116

[21] Appl. No.: 926,936

[22] Filed: Aug. 10, 1992

[51] Int. Cl.$^5$ .............................................. B62B 13/00
[52] U.S. Cl. ................................ 280/28.12; 220/501; 220/523
[58] Field of Search .................... 280/19, 19.1, 28.12, 280/28.17; 220/523, 524, 501

[56] References Cited

U.S. PATENT DOCUMENTS

| | | | |
|---|---|---|---|
| 1,585,575 | 5/1926 | Van Husan | 280/28.12 |
| 2,681,809 | 6/1954 | Hamill | 280/28.12 |
| 3,030,122 | 4/1962 | Madera | 280/28.12 |
| 4,456,272 | 6/1984 | Kroeger | 280/28.12 |
| 4,730,569 | 3/1988 | Colson | 280/28.12 X |
| 4,918,853 | 4/1990 | Bascom et al. | 280/28.12 X |
| 5,085,446 | 2/1992 | Hoffman | 280/19.1 |

Primary Examiner—Margaret A. Focarino
Assistant Examiner—Michael Mar
Attorney, Agent, or Firm—Gifford, Groh, Sprinkle, Patmore and Anderson

[57] ABSTRACT

A portable supply box particularly for use in ice fishing is disclosed. The holding unit includes a body mounted on a pair of parallel ski-type runners. The unit includes an interior that is divided into three sections. The first section is a lantern section, the second is an intermediate section, and the third is a rear section. A seat is provided over the intermediate section. Both the intermediate and rear sections include hinged covers. One or both of these sections may be used for storing goods. A tray is provided for holding fishing articles such as hooks. The user straddles the body so that his hands are disposed over the lantern section. There is an opening provided over the lantern section so that rising heat may be used to warm the user's hands. A window is provided on the front end of the lantern section so that light may pass therethrough for illuminating the local environment for fishing during the evening or at night.

6 Claims, 2 Drawing Sheets

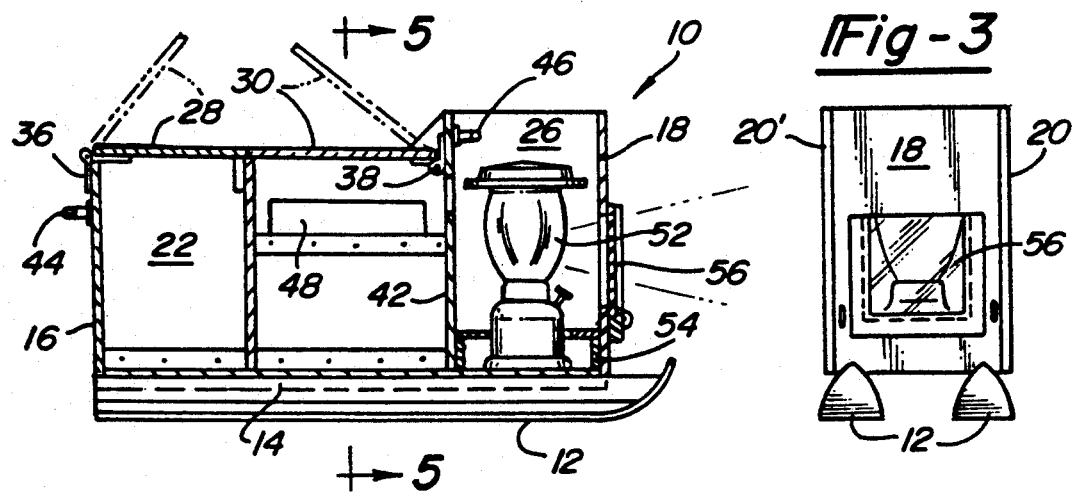
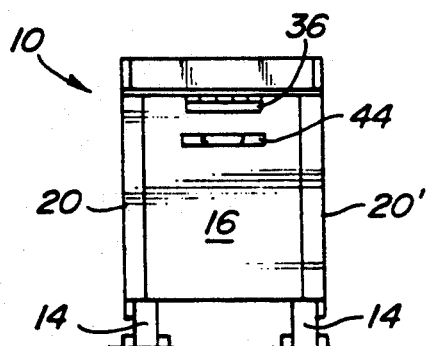
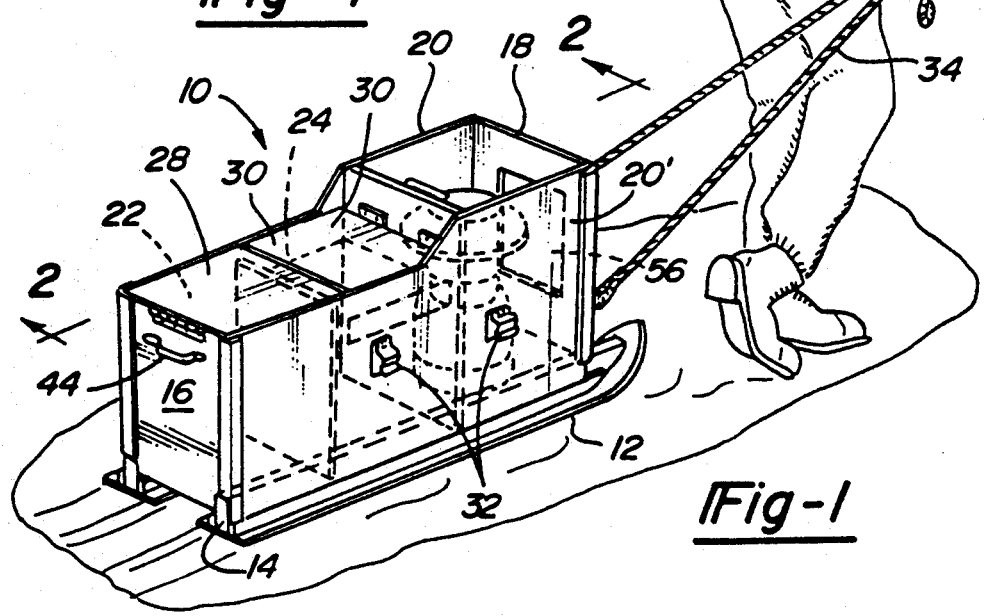

SPORTSMAN'S PORTABLE SUPPLY BOX SUITED FOR ICE FISHING

BACKGROUND OF THE INVENTION

The present invention relates to a supply box for sportsmen. More particularly, the present invention is directed to a portable supply box having runners provided on the bottom side thereof and being divided internally into a number of sections for storing equipment. One of the sections includes a heat and light generating lantern.

II. Description of the Relevant Art

Early in the roots of civilization there were people living in cold climates who relied upon fish as their primary protein source. These fish were drawn from moving or still waters. During the winter season the waters often froze, requiring these early hunters to break the ice in order to draw the fish from the cold waters.

Modern fisherman who live in areas where the water seasonally freezes still engage in this ancient practice in much the same way as did their predecessors. Today, however, most ice fishing is done with sophisticated equipment and the "hunters" of today are mostly engaged in the activity for sport rather than for survival.

However, the one constant present in today's sport just as much as it was many millenia ago is the ever-present cold and the need to portage about the vast array of fishing equipment and food that is used for the day's outing. Ice fishing is a waiting sport for the most part, and the waiting becomes arduous and quite unpleasant at temperatures below freezing.

The fisherman's extremeties are highly susceptible to cold and frostbite. This is particularly true of the hands which must be either exposed or only thinly covered to allow the fisherman to manipulate the bait and hook and to also provide the fisherman with the requisite amount of sensitivity required to sense the jerk of a biting fish. Most sportsmen acknowledge that the cold and inconvenience of carrying equipment and food about are not enjoyable features of the sport.

There have been efforts in the past to provide the ice fisherman with equipment to ease the discomfort of their sport For example, U.S. Pat. No. 2,681,809 issued to Hamill discloses a storage box having a seat and runners. In addition, U.S. Pat. No. 5,085,446 issued to Hoffman discloses a seating unit that includes a shelter supported by a frame. The shelter includes a seat.

However, all previously known equipment fails to provide an efficient method for carrying equipment while at the same time providing warmth to the user. Accordingly, there is wanting a unit which provides both an efficient method for transporting equipment and a system for keeping the sportsman warm.

SUMMARY OF THE INVENTION

The present invention provides a portable supply box for a sportsman that overcomes the problems of the prior art by providing a portable unit that includes ample space for storage, a seat for resting, and a method for heating the hands of the user while illuminating the fishing environment. This feature is, therefore, particularly useful when fishing at night. The light enables the fisherman to more completely see his immediate environment, thereby allowing him to better manipulate his equipment and to generally have greater fishing success.

The supply box of the present invention includes a body mounted on a pair of parallel ski-type runners. The runners are preferably composed of a resilient polymerized material such as Lexan (trademark). The runners allow the box to be readily transported across both ice and snow. The runners run the entire length of the box parallel to its longitudinal axis.

The body may be composed of one of several materials, or may be a combination of materials such as a plastic or wood. Regardless of the material used, the object of the construction is to provide such a box that is durable while at the same time being of light weight. This feature is important for two reasons. First, so that the box may be easily lifted and carried by the user as is necessary for removing the box from and returning it to the user's vehicle. Second, so that the box does not sink into the snow or mud.

The body has a front end and a rear end. Two handles are provided for grasping the body for easy carrying. A lead rope is preferably connected to the front end for pulling the box to the preferred fishing site.

The interior of the body is preferably divided into three sections. These include a front section, an intermediate section and a rear section. The sections are divided by full or partial walls. Access into the intermediate and rear sections is provided by an opening defined in the top of each section. The opening is coverable by a hinged top, one provided for each section. Either or both of the hinged tops may be fitted with a seat whereby the user may straddle the box with his legs to either side. One or both of the intermediate and rear sections is provided with a removable tray or holder for supporting hooks and the like.

The front section preferably has no cover or has a cover with an aperture defined therein. Within the front section is provided a gas or oil powered lantern having an ignitable wick or mantle. The lantern serves a dual purpose in that it provides both heat and light for use after dark. With the user seated atop the box and facing the front, his hands are preferably positioned immediately above the front section. The heat rising from the lantern provides much-needed warmth to the sportsman's hands, thereby allowing him to go without gloves or to use only minimal protection from the cold.

In addition to providing warmth to the user's hands, the heat generated by the lantern also warms the intermediate section, its contents, and the seat of the box. This slight warmth to the intermediate section is particularly useful in that live bait and the like may be kept therein without freezing.

The front wall of the front section is additionally provided with a clear plate thereby allowing passage of light so as to illuminate the immediate fishing environment during evening or night fishing. This is very useful to the fisherman because this is the direction he is facing when seated on the box.

For the accomplishment of these and related objects which shall become apparent as the description proceeds, the present invention resides in the construction, combination and arrangement of parts as shall be hereinafter more fully described, illustrated in the accompanying drawings, and pointed out in the appended claims.

BRIEF DESCRIPTION OF THE DRAWING

FIG. 1 is a perspective view of a portable supply box shown in partial shadow line and shown being pulled by a sportsman;

FIG. 2 is an elevated sectional side view of the portable supply box shown in FIG. 1 and taken along line 2—2 of that figure;

FIG. 3 is an elevated front view of the present invention;

FIG. 4 is an elevated rear view of the present invention; and

DETAILED DESCRIPTION OF THE PREFERRED EMBODIMENT OF THE PRESENT INVENTION

Figure 5:
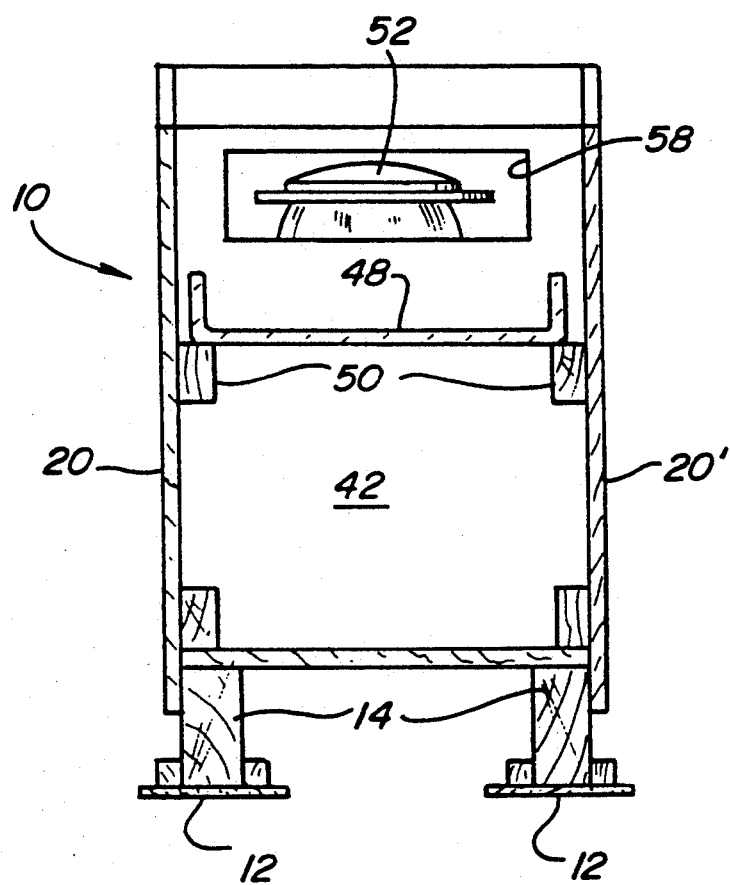
FIG. 5 is an elevated sectional end view of the present invention taken along line 5—5 of FIG. 2.

The drawing discloses the preferred embodiment of the present invention. While the configuration according to the illustrated embodiment is preferred, it is envisioned that alternate configurations of the present invention may be adopted without deviating from the invention as portrayed. The preferred embodiment is discussed hereafter.

Referring to FIG. 1, a perspective view of the portable supply box is generally illustrated as 10. The box 10 includes a pair of parallel ski-type runners 12. The runners 12 preferably have a width of approximately four inches (about ten centimeters). The runners could be thin and narrow, but are preferably wide and flat like skiis. This latter construction resists the box becoming trapped or stuck in ice, snow or mud. A pair of supporting blocks 14 separates the runners 12 from the underside of the box 10.

The box 10 includes a rear wall 16, a front wall 18, and a pair of side walls 20, 20'. The interior of the box is divided into three sections, a rear section 22, an intermediate section 24, and a front section 26. These sections may be clearly seen by shadow lines. The top end of the front section 26 is open, while the rear section 22 includes a hinged top 28. The intermediate section includes a hinged top 30.

One or more fishing pole attachment fittings 32 are provided on the side of the box 10. The fittings 32 are used for releasable attachment of a fishing pole (not shown). In this way one or more poles may be easily transported conveniently and without risk of damage.

A guide line 34 is attached to the front wall 18. The line 34 is useful in pulling the box 10 to and from an appropriate fishing site.

Referring to FIG. 2, an elevated sectional side view of the box 10 is illustrated. This view more plainly illustrates the internal components and features of the portable supply box of the present invention.

As discussed above with respect to FIG. 1, the interior of the box 10 is divided into the rear section 22, the intermediate section 24, and the front section 26. The rear section 22 is separated from the intermediate section 24 by a wall 40, while the intermediate section 24 is separated from the front section 26 by a wall 42.

The hinged tops 28, 30 provided over the rear section 22 and the intermediate section 24 respectively are shown in shadow lines in their partially elevated positions. The hinged top 28 is attached to the rear wall 16 of the box 10 by a hinge 36, while the hinged top 30 is attached to the wall 42 by a hinge 38. Also provided on the rear wall 16 is a rear handle 44. Provided on the front side of wall 42 is a front handle 46. The handles 44, 46 are used simultaneously by the sportsman to lift and lower the box 10 when it is removed from or returned to the sportsman's automobile, truck, van, or trailer.

Within either the rear section 22 or the intermediate section 24 is provided one or more trays 48 for supporting and organizing fishing hooks, bobbers, lures, sinkers and the like. The tray 48 is supported by a shelving system 50. The tray 48 may be removed or reinserted to allow the user access to the bait (not shown) contained within the intermediate section 24.

A gas or oil powered lantern 52 is provided within the front section 26. As mentioned, the top of the section 26 is open to allow the by-passage of heat generated by and rising up from the lantern 52. A fount supporting frame 54 is provided within the base of the front section 26 to supply support for the fount of the lantern 52 to prevent its tipping or shifting.

The energy generated by the combustion of the fuel in the lantern 52 is also visible as light while being felt as heat. This light is allowed to pass through a clear plate 56 removably provided on the front wall 18 of the box 10. The light that passes therethrough is useful in illuminating the fisherman's hole in the ice and local environment when fishing at night. The light is also useful to illuminate the fisherman's way when setting out or returning in the dark.

Referring to FIG. 3, a front elevated view of the box 10 is illustrated. This view more clearly shows the clear plate 56 positioned on the front wall 18. This view also more clearly illustrates the positioning of the ski-type runners 12 with respect to the body of the box 10.

FIG. 4 illustrates a rear elevated view of the box 10 of the present invention. The shelving system 50 is more easily viewed in this figure. Of particular interest in this view is the space separating the underside of the body of the box 10 from the ground. This wide space allows the box 10 of the present invention to be run along both smooth and rough terrain with minimum difficulty.

FIG. 5 illustrates a sectional view taken along line 5—5 of FIG. 2 looking toward the wall 42 dividing the front section 26 and the intermediate section 24. An opening 58 is illustrated as being defined in the wall 42.

Having described my invention, however, many modifications thereto will become apparent to those skilled in the art to which it pertains without deviation from the spirit of the invention as defined by the scope of the appended claims.

I claim:

1. A mobile holding unit for use in ice sports, said unit comprising:

a body, said body having a bottom side;

means for sliding, said means for sliding being provided on said bottom side of said body;

said body including an interior region;

said body being divided into a front section, a middle section, and a rear section;

said middle and rear sections each having a top side, said top sides of said middle and rear sections each including a door, each of said doors being movable from a closed position to an open position;

said front section including a lantern for generating heat and light, whereby said middle section is warmed by said lantern while said rear section remains unwarmed;

said front section including a front wall, said front wall including a light-passing transparent plate;

a partial wall disposed between said front section and said middle section, said partial wall having defined therein an aperture whereby heat generated by said lantern may be allowed to pass therethrough;

said front section including a top side, said top side having an opening defined therein, whereby said heat-generating device may warm regions of the user's body by placing them near said opening.

2. The mobile holding unit of claim 1 wherein said body includes a fishing-rod holding bracket.

3. The mobile holding unit of claim 1 wherein said unit includes a shelf and said interior region includes shelving support for holding said shelf.

4. The mobile holding unit of claim 3 wherein said shelf is a fishing-accessory holding drawer.

5. The mobile holding unit of claim 1 wherein said body includes a carrying handle.

6. The mobile holding unit of claim 1 wherein said front end of said body includes a pulling line attached thereto.

* * * * *

UNITED STATES PATENT AND TRADEMARK OFFICE
CERTIFICATE OF CORRECTION

PATENT NO. :   5,251,921

DATED      :   Oct. 12, 1993

INVENTOR(S) :  Robert R. DANIELS

It is certified that error appears in the above-identified patent and that said Letters Patent is hereby corrected as shown below:

```
Column 1, after "BACKGROUND OF THE INVENTION" of line 5,
   please insert --I. Field of the Invention--; and
column 5, line 7 (claim 1), change "warn" to --warm--.
```

Signed and Sealed this

Twenty-ninth Day of March, 1994

Attest:

BRUCE LEHMAN

*Attesting Officer*            *Commissioner of Patents and Trademarks*